United States Patent
Franklin et al.

(10) Patent No.: US 9,400,349 B2
(45) Date of Patent: Jul. 26, 2016

(54) ELECTRONIC DEVICE WITH DISPLAY CHASSIS STRUCTURES

(71) Applicant: Apple Inc., Cupertino, CA (US)

(72) Inventors: Jeremy C. Franklin, San Francisco, CA (US); Kevin D. Gibbs, San Carlos, CA (US); Amy Qian, San Jose, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 13/673,808

(22) Filed: Nov. 9, 2012

(65) Prior Publication Data

US 2014/0133179 A1    May 15, 2014

(51) Int. Cl.
*G02F 1/00* (2006.01)
*F21V 8/00* (2006.01)
*G02F 1/1335* (2006.01)
*G02F 1/1333* (2006.01)

(52) U.S. Cl.
CPC ............ *G02B 6/0093* (2013.01); *G02B 6/0088* (2013.01); *G02F 1/133615* (2013.01); *G02F 2001/133317* (2013.01)

(58) Field of Classification Search
CPC ................... G02F 1/133305; G02F 1/133308; G02F 1/133509; G02F 1/133512; G02F 2001/133507; G02F 2201/38; G02F 2202/28
USPC ............. 362/600–634, 97.1–97.4; 349/58–60
See application file for complete search history.

(56) References Cited

U.S. PATENT DOCUMENTS

| | | | |
|---|---|---|---|
| 5,745,202 A * | 4/1998 | Yamauchi et al. | 349/110 |
| 5,816,677 A * | 10/1998 | Kurematsu et al. | 362/609 |
| 6,064,455 A * | 5/2000 | Kim | 349/113 |
| 6,295,105 B1 * | 9/2001 | Lee et al. | 349/65 |
| 6,690,435 B1 * | 2/2004 | Ha et al. | 349/61 |
| 7,182,500 B2 | 2/2007 | Sugawara | |
| 7,369,400 B2 * | 5/2008 | Bang et al. | 361/679.27 |
| 7,911,774 B2 | 3/2011 | Nakanishi et al. | |
| 7,944,521 B2 | 5/2011 | Ichioka et al. | |
| 7,993,730 B2 | 8/2011 | Ayukawa | |
| 8,243,227 B2 | 8/2012 | Oohira | |
| 2004/0032725 A1 * | 2/2004 | Hsieh et al. | 362/31 |
| 2004/0036819 A1 * | 2/2004 | Ryu et al. | 349/58 |

(Continued)

OTHER PUBLICATIONS

Qian et al., U.S. Appl. No. 13/528,465, filed Jun. 20, 2012.

*Primary Examiner* — Evan Dzierzynski
*Assistant Examiner* — Zheng Song
(74) *Attorney, Agent, or Firm* — Treyz Law Group, P.C.; Kendall P. Woodruff; Zachary D. Hadd

(57) ABSTRACT

Electronic devices may include displays. A display may include backlight components that provide backlight illumination for the display. Backlight components may include a light guide plate that distributes light from a light source across the display. Display chassis structures may be used to support display layers and backlight components. A metal chassis may include a portion that partially surrounds the light source. Openings or perforations in the metal chassis may allow the portion that surrounds the light source to flex about a flex axis. A portion of a display layer may be mounted to a plastic chassis. The plastic chassis may be insert molded over a light source, may form part of a package for a light source, may be adhered to a light source, or may wrap around the light source. An encapsulant may be formed over the light source to protect the light source from vibrations and contaminants.

17 Claims, 15 Drawing Sheets

(56) References Cited

U.S. PATENT DOCUMENTS

| | | | |
|---|---|---|---|
| 2005/0030727 A1* | 2/2005 | Shimura | G02B 6/0063 362/23.15 |
| 2007/0290965 A1* | 12/2007 | Shiraishi | 345/87 |
| 2008/0278661 A1* | 11/2008 | Oh | G02B 6/0088 349/65 |
| 2011/0134346 A1* | 6/2011 | Hayashi et al. | 348/790 |
| 2011/0255033 A1* | 10/2011 | Huang et al. | 349/65 |
| 2011/0310327 A1* | 12/2011 | He | 349/61 |

* cited by examiner

ELECTRONIC DEVICE WITH DISPLAY CHASSIS STRUCTURES

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size, weight, electrical grounding, robustness, ease of assembly, and light-tightness are often important considerations in designing electronic devices. If care is not taken, displays may be bulky, may exhibit undesired light reflections, or may be prone to damage during a drop event. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may have display layers for displaying images. Backlight structures may be included in the display. The backlight structures may provide backlight that illuminates the display layers in the display that are displaying an image for a user.

Display chassis structures may be used to support display layers and backlight structures. The display chassis structures may include a metal display chassis and a plastic display chassis.

The metal display chassis may include a planar portion and a bent portion. The bent portion may partially surround a light source. Flex promotion features may be formed in the bent portion to allow the bent portion of the metal display chassis to flex around one or more flex axes. The flex promotion features may include openings or perforations. An opaque film may be used to cover the openings so that light is prevented from passing through the openings.

A light source may emit light into the edge of a light guide plate in a display. The light source may include a semiconductor device mounted on a lead frame structure. A wire bond may electrically couple the semiconductor device to the lead frame structure. The lead frame structure may be mounted on a flexible printed circuit substrate using solder. A plastic package may be molded over the semiconductor device and lead frame structure.

A plastic display chassis on which a portion of a display layer is mounted may be insert molded over the light source. An encapsulant may be formed over the light source to protect the light source from vibrations and contaminants. The encapsulant may include potting material.

A plastic display chassis on which a portion of a display layer is mounted may form part of a package for a light source. The plastic display chassis may be injection molded over at least some of the light-emitting diode and lead frame structure that form the light source.

A light source may be mounted on a printed circuit substrate. The printed circuit substrate may be attached to a metal display chassis using adhesive.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
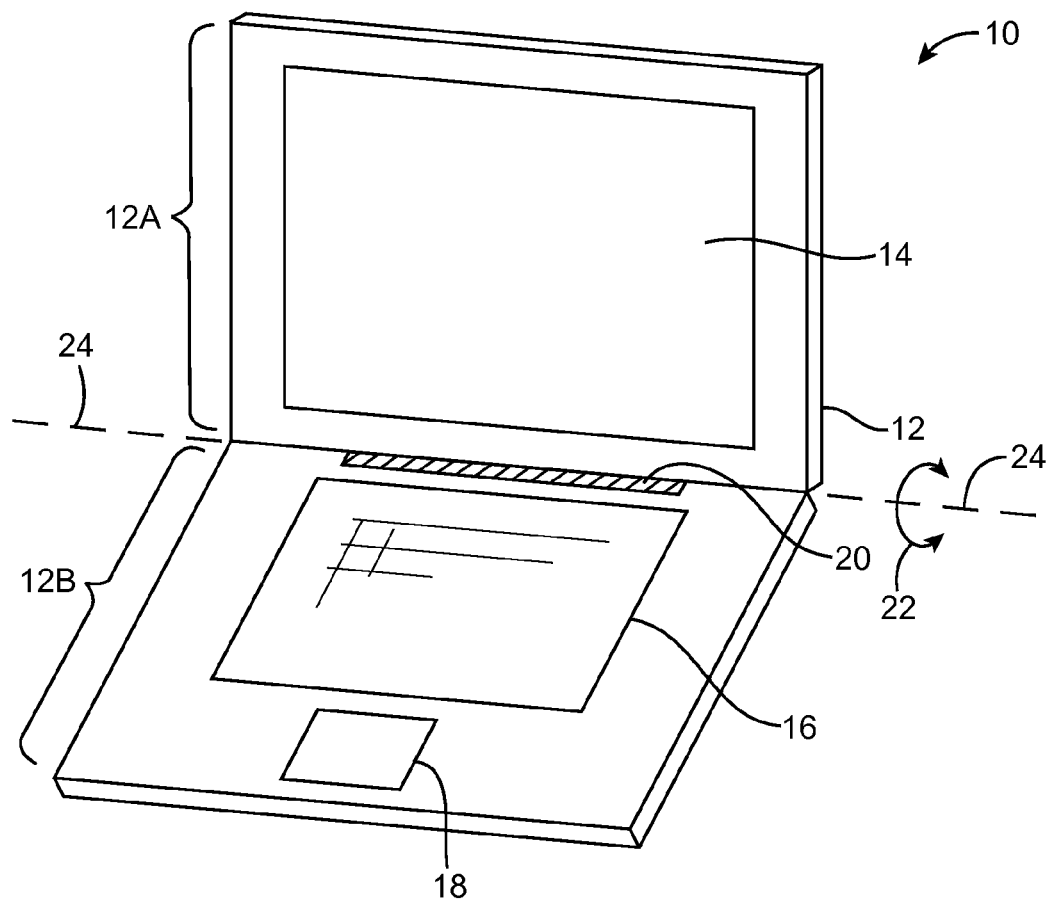
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
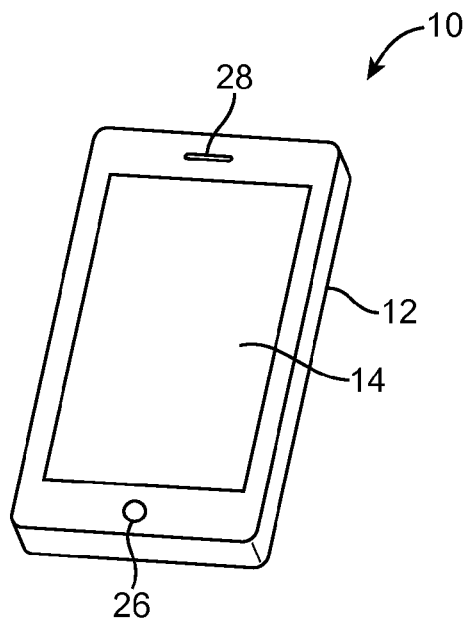
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
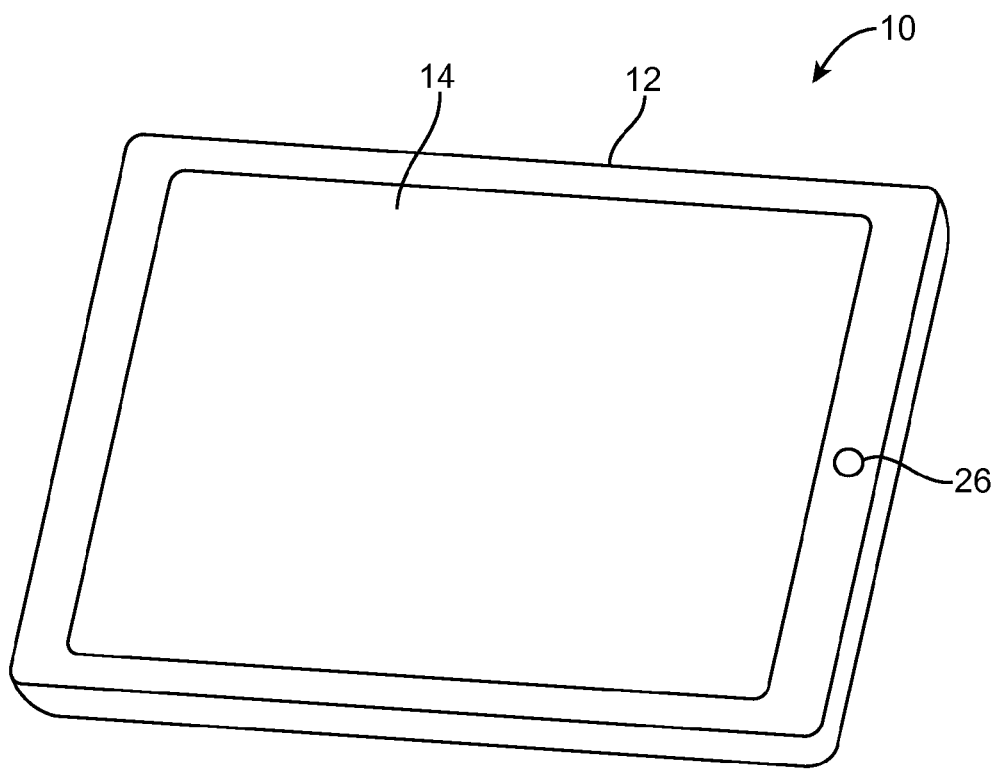
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
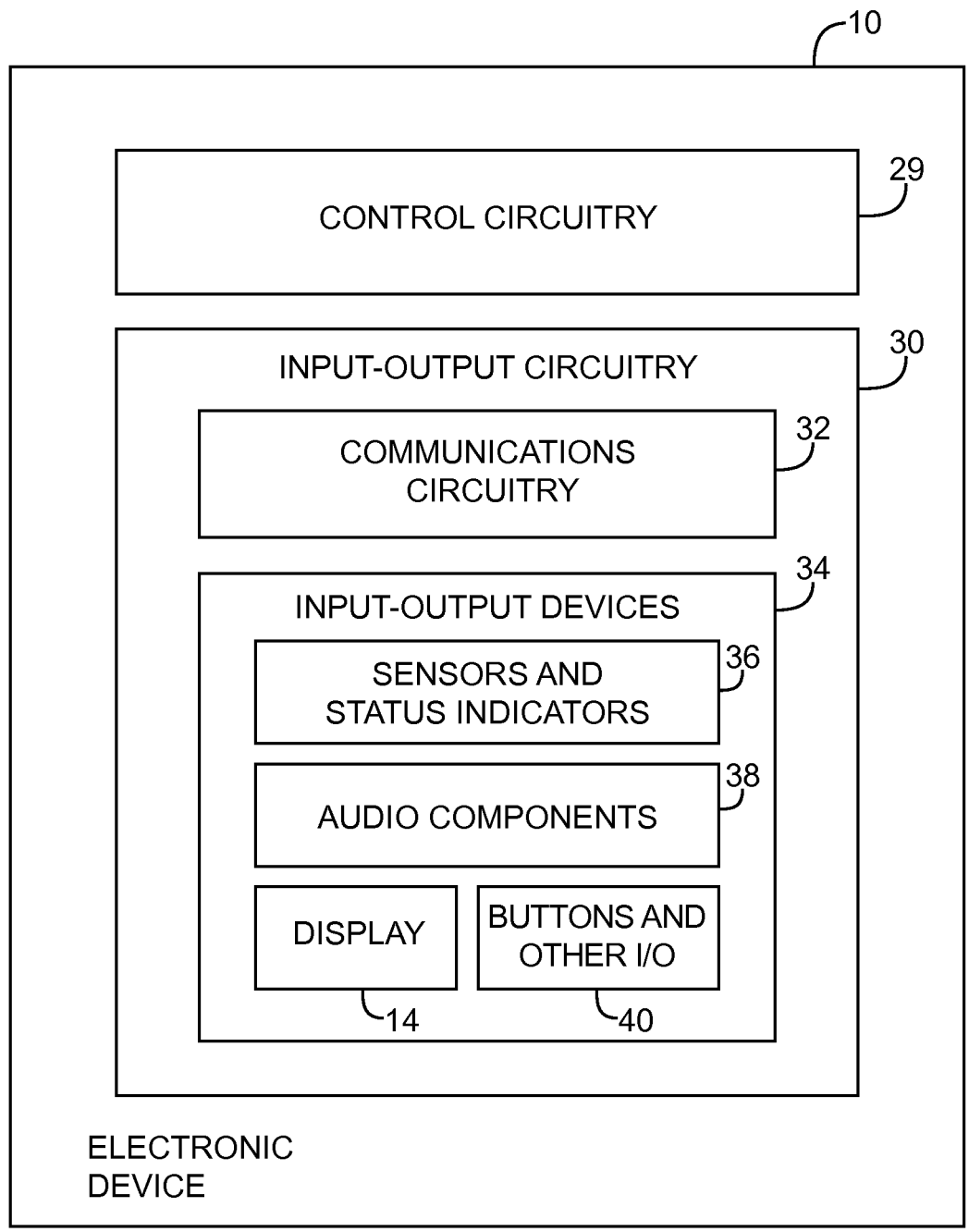
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
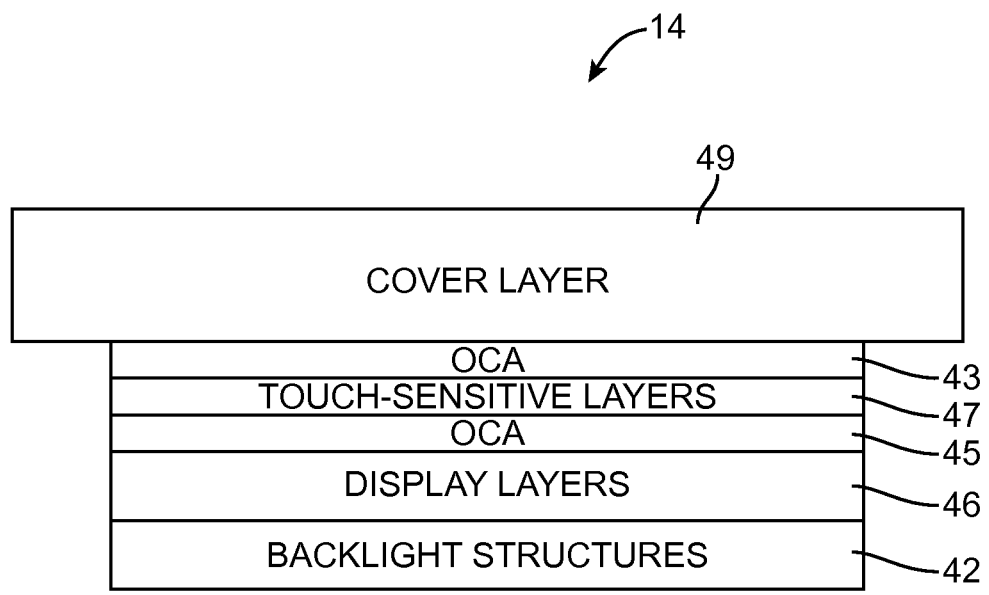
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include one or more layers of touch sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Adhesive 43 may be liquid adhesive, light-cured adhesive, pressure-sensitive adhesive or other suitable adhesive. Touch-sensitive layers 47 may include touch sensor components such as an array of capacitive touch sensor electrodes formed from transparent materials such as indium tin oxide.

Display 14 may include display layers such as layers 46 for generating images to be displayed on display 14. Display layers 46 may include polarizer layers, color filter layers, transistor layers, adhesive layers, layers of liquid crystal material, or other layers for generating display images. Display layers 46 may be attached to touch-sensitive layers 43 using adhesive such as optically clear adhesive 45. Adhesive 45 may be liquid adhesive, light-cured adhesive, pressure-sensitive adhesive or other suitable adhesive.

Display layers 46 may use light generated by light-generating structures such as backlight structures 42 to form images to be viewed by a user of device 10. Backlight structures 42 may include light-generating components such as light-emitting diodes, light guiding structures, reflective structures, optical films, etc. Backlight structures 42 may be attached to display layers 46 or may be mounted adjacent to layers 46 by attaching backlight structures 42 to one or more structural members.

Figure 6:
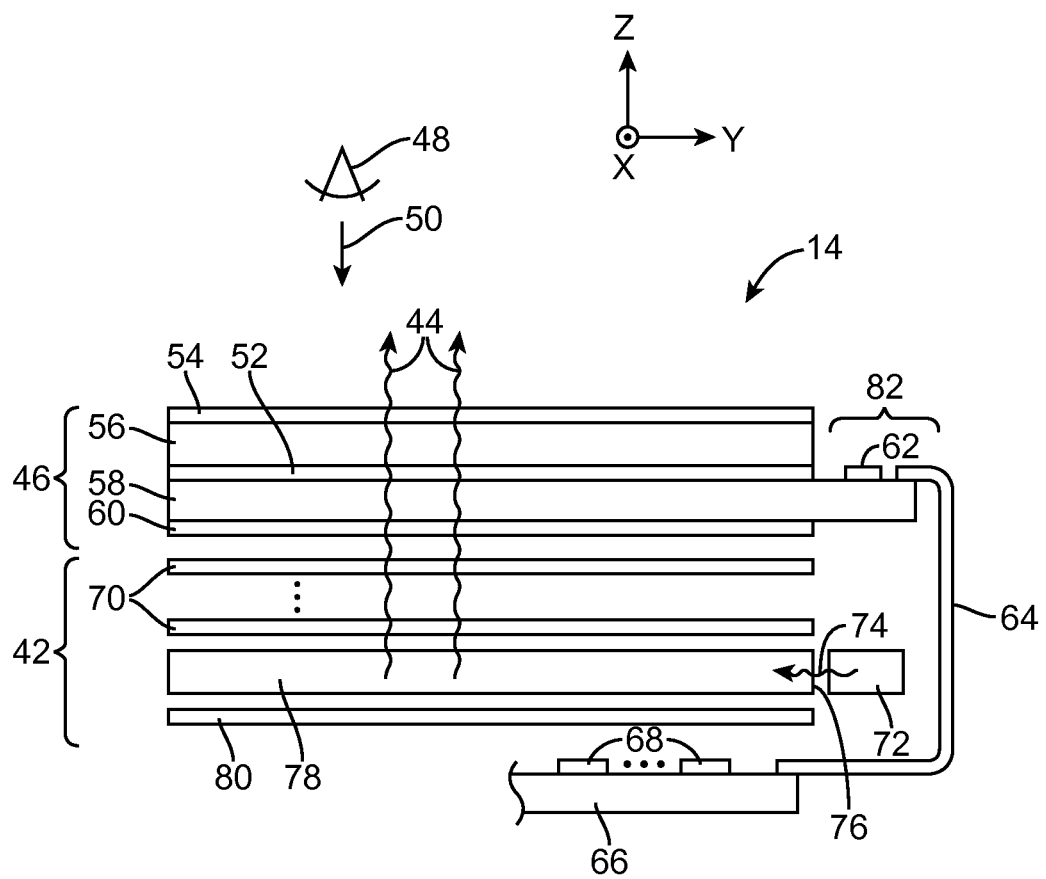
FIG. 6 is a cross-sectional side view of illustrative display layers and backlight structures in accordance with an embodiment of the present invention.

A cross-sectional side view of an illustrative configuration that may be used for display layers 46 and backlight structures 42 of display 14 (e.g., for display layers 46 and backlight structures 42 of the display of FIG. 5, or other suitable display) is shown in FIG. 6. As shown in FIG. 6, display 14 may include backlight structures such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 6) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film transistor layer driver ledge 82 or elsewhere in device 10. A flexible printed circuit cable such as flexible printed circuit 64 may be used in routing signals between printed circuit 66 and thin-film transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 6, optical films 70 and reflector 80 may have a matching rectangular footprint.

Figure 7:
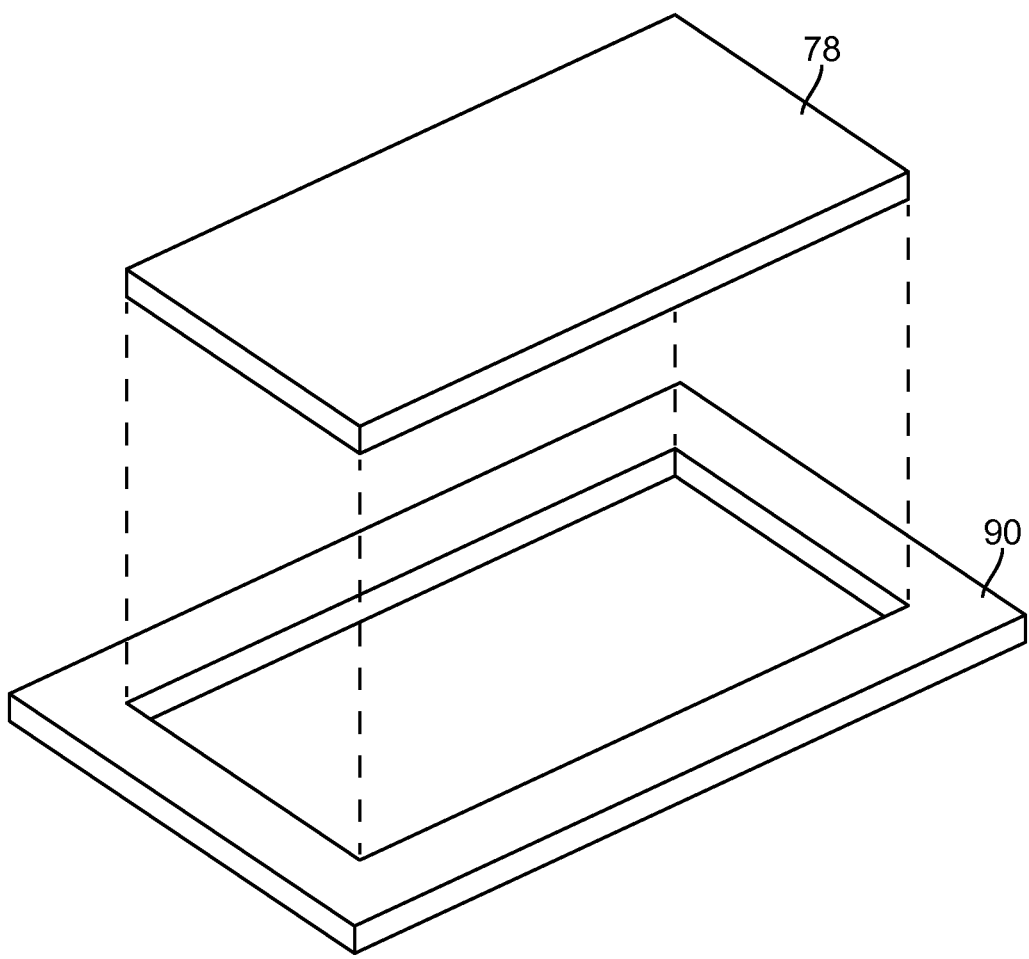
FIG. 7 is a perspective view of a light guide plate and corresponding chassis structure in accordance with an embodiment of the present invention.

Display structures such as light guide plate 78 may be mounted in a support structure such as display chassis 90 of FIG. 7. Display chassis 90 may include plastic chassis structures and metal chassis structures. Display chassis 90 may serve as an interface between the structures of display 14 and surrounding portions of housing 12. If desired, display chassis 90 may include a ring of plastic (e.g., a plastic ring with a thickness of about 0.2 to 1.5 mm, as an example) or may be formed from a plate of material that includes a rectangular recess to accommodate display structures such as light guide plate 78. Chassis structure 90 may be formed from housing structures (e.g., as part of a housing frame, part of a unibody housing such as a metal housing, etc.).

The arrangement of FIG. 7 in which chassis structure 90 surrounds light guide plate 78 and is formed from a single contiguous structure is merely illustrative. If desired, chassis structure 90 may only partially surround light guide plate 78, may be formed from multiple structures, and/or may be formed from different materials.

Figure 8:
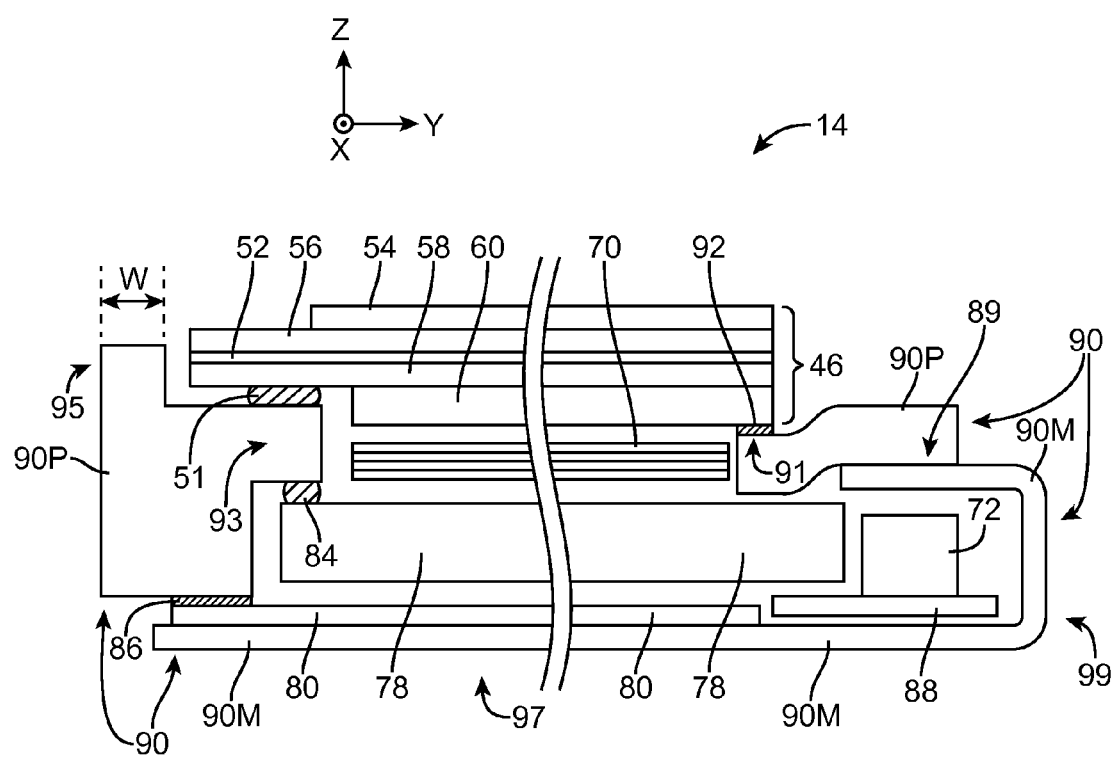
FIG. 8 is a cross-sectional side view of illustrative display layers, backlight structures, and chassis structures in accordance with an embodiment of the present invention.

An illustrative arrangement in which display 14 is mounted in a chassis structure that includes multiple parts formed from different materials is shown in FIG. 8. As shown in FIG. 8, chassis structure 90 may include a plastic display chassis such as plastic chassis member 90P (sometimes referred to as a p-chassis) and a metal display chassis such as metal chassis member 90M (sometimes referred to as an m-chassis). Plastic chassis member 90P and metal chassis member 90M may each be formed from a single structure or may each include multiple parts.

Display structures such as display layers 46 may be mounted on a planar portion such as portion 91 of plastic chassis 90P. An adhesive such as adhesive 92 may be used in attaching an interior layer of display layers 46 such as lower polarizer 60 to planar surface 91 of plastic chassis 90P. Adhesive 92 may be liquid adhesive, light-cured adhesive, pressure-sensitive adhesive, or other suitable adhesive. If desired, adhesive 92 may be optically clear adhesive.

Plastic chassis 90P may have a protruding portion such as protruding portion 93 that extends between some of display layers 46 and light guide plate 78. Adhesive such as adhesive 84 may be used in attaching light guide plate 78 to the underside of protruding portion 93 of plastic chassis 90P. A display layer such as display layer 58 may be attached to plastic chassis 90P using an adhesive such as adhesive 51. Adhesives 51 and 84 may be liquid adhesives, light-cured adhesives, pressure-sensitive adhesives, or other suitable adhesives. If desired, adhesives 51 and 84 may be optically clear adhesives.

Plastic chassis 90P may be formed from materials such as polycarbonate, polycarbonate acrylonitrile butadiene styrene (PC-ABS), nylon, glass-filled polycarbonate, glass-filled nylon, silicone, or other suitable materials. Using a glass-reinforced plastic may lower the thermal expansion coefficient of chassis 90P. Chassis 90P may include any suitable amount of glass fibers (e.g., 10%, 20%, 30%, 40%, or other suitable amount of glass). If desired, chassis 90 may contain a sufficient amount of glass to lower the thermal expansion coefficient to a desired level without causing chassis 90P to be excessively rigid. If desired, chassis 90P may be free of glass fibers. The example in which chassis 90P is formed from glass-filled polycarbonate (e.g., a low-glass-filled polycarbonate) is merely illustrative.

Features such as low coefficient of thermal expansion and low rigidity may ensure that chassis 90P provides structural support for display 14 without inducing undesired stress on display 14. For example, the thermal expansion coefficient of chassis 90P may be matched to that of other structures in device 10 such as device housing structures (e.g., housing 12 of FIGS. 1, 2, and 3). This may ensure that chassis 90P and the surrounding structures such as housing 12 expand at similar rates when device 10 heats up.

Chassis 90P may be provided with other features that may help minimize mechanical stress on display 14. For example, chassis 90P may have a minimized footprint in the X-Y plane. Wall sections such as wall section 95 of chassis 90P may, for example, have a width W of about 0.1 mm, 0.2 mm, 0.3 mm, less than 0.3 mm, more than 0.3 mm, etc.

Chassis structure 90P may be molded (e.g., using an injection molding process or other suitable molding process), machined, thermoformed, or may be formed using any other suitable fabrication process. Plastic chassis 90P may, for example, be injection molded over metal chassis 90M (e.g., at the corners of device 10 or at other suitable locations in device 10). In the example of FIG. 8, plastic chassis 90P is attached to metal chassis 90M at location 89.

Metal chassis 90M may be formed from stainless steel sheet metal or other suitable materials. Chassis 90M may have a planar portion such as portion 97 that overlaps light guide plate 78 and a bent portion such as portion 99 that wraps around an edge portion of light guide plate 78 (e.g., using a C-shaped wrap). As shown in FIG. 8, backlight structures may be mounted in c-shaped portion 99 of chassis 90M. For example, light-emitting diodes 72 may be mounted on a substrate such as substrate 88. Light-emitting diodes 72 and substrate 88 may be mounted within c-shaped portion 99 of chassis 90M (e.g., light-emitting diodes 72 and substrate 88 may be interposed between upper and lower layers of metal chassis 90M). Substrate 88 may be formed from a rigid printed circuit board material (e.g., fiberglass-filled epoxy material such as FR4) or a flexible printed circuit substrate material such as polyimide or a sheet of other flexible polymer. Substrate 88 may be mounted on planar portion 97 of chassis 90M.

As shown in FIG. 8, reflector 80 may be interposed between metal chassis 90M and light guide plate 78. Reflector 80 may be attached to plastic chassis 90P using an adhesive such as adhesive 86 (e.g., a pressure sensitive or other suitable adhesive).

Figure 9:
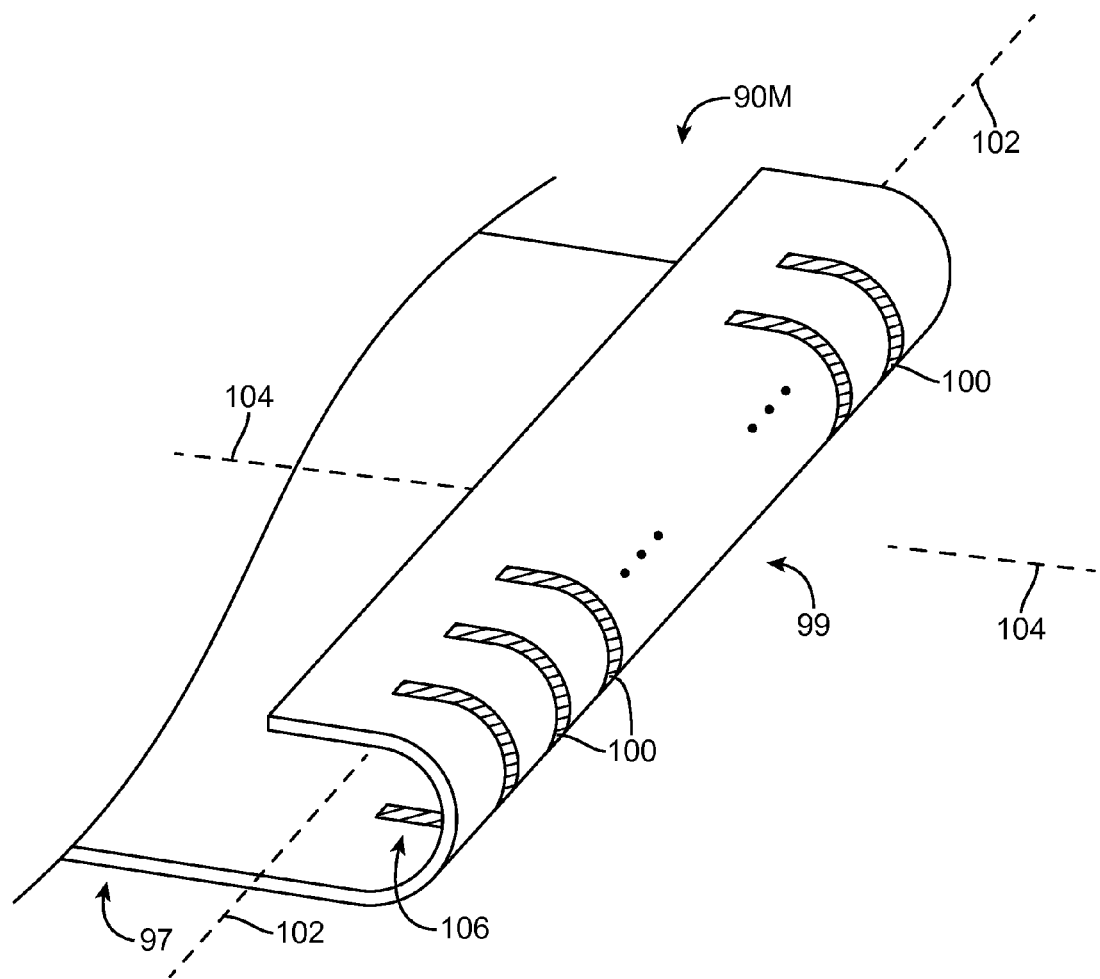
FIG. 9 is a perspective view of a metal display chassis having flex promotion features such as openings in accordance with an embodiment of the present invention.

Metal chassis 90M may be provided with features that may help minimize mechanical stress on display 14. For example, as shown in FIG. 9, chassis 90M may include flex promotion features such as flex promotion features 100. Flex promotion features 100 may include holes, openings, notches, or perforations in curved portion 99 of chassis 90M. Flex promotion features 100 may allow chassis 90 to flex slightly around flex axes 102 and 104. Flex promotion features 100 may be formed using any suitable metalworking process (e.g., chemical etching, perforating, coining, stamping, other suitable methods, etc.).

As shown in FIG. 9, flex promotion features 100 may be formed along c-shaped portion 99. Flex promotion features 100 may be formed locally at the bend in chassis 99. If desired, flex promotion features 100 may extend into planar portion 97, as shown by portion 106 of opening 100.

Figure 10:
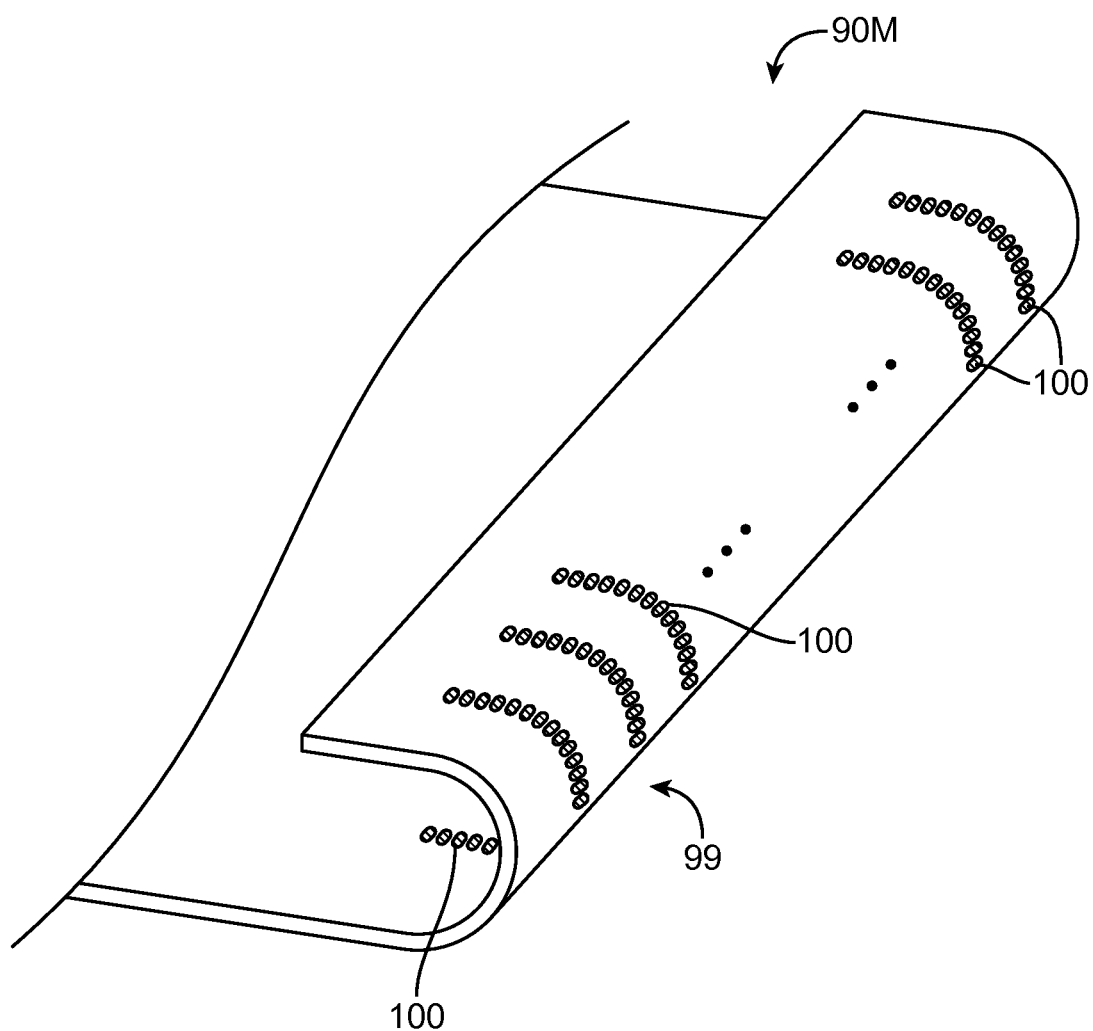
FIG. 10 is a perspective view of a metal display chassis having flex promotion features such as perforations in accordance with an embodiment of the present invention.

In the example of FIG. 9, flex promotion features 100 are each formed as an elongated opening that is contiguous throughout the c-shape. This is, however, merely illustrative. If desired, flex promotion features 100 may have an arrangement of the type shown in FIG. 10. As shown in FIG. 10, flex promotion features 100 may each be formed as multiple openings in chassis 90M. For example, flex promotion features 100 may include perforations formed along curved portion 99 of chassis 90M.

The examples of FIGS. 9 and 10 in which openings 100 have rounded shapes are merely illustrative. In general, openings 100 may have any suitable shape (triangular, rectangular, rectilinear, circular, thin lines, etc.).

Figure 11:
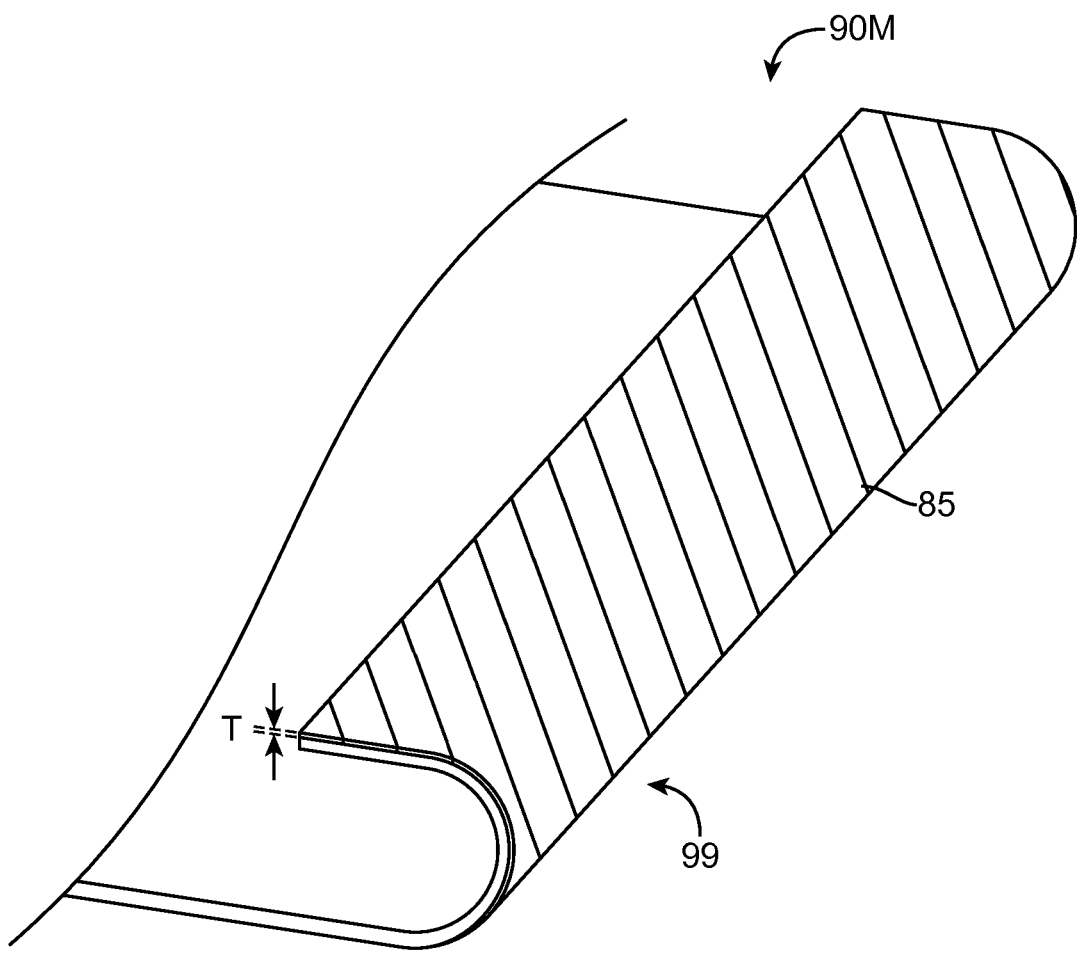
FIG. 11 is a perspective view of a metal display chassis that has been partially covered with an opaque layer of film in accordance with an embodiment of the present invention.

If desired, a blackout layer may be used to prevent light from escaping through openings 100. FIG. 11 shows an illustrative arrangement in which a blackout layer such as blackout layer 85 is formed over openings 100 (e.g., on an exterior surface of chassis 90M). Blackout layer 85 may be formed from an optically opaque film or adhesive (e.g., Mylar® film, other polyester film, other optically opaque adhesives or tapes, etc.). Blackout layer 85 may, for example, be formed from a layer of black polyester film having a thickness T of 20-30 microns. If desired, opaque layer 85 may be laminated to the exterior surface of chassis 90M.

In the example of FIG. 11, blackout layer 85 is formed as a contiguous layer that covers openings 100 in chassis 90M. This is, however, merely illustrative. If desired, optically opaque layer 85 may include separate portions that are localized to cover individual openings 100 in chassis 90M.

Flex promotion features 100 of FIGS. 9 and 10 may help reduce the rigidity of chassis 90M while still allowing chassis 90M to provide structural support for display 14. If desired, bent portion 99 of metal chassis 90M may be omitted. An illustrative arrangement in which metal chassis 90M does not include c-shaped portion 99 is shown in FIG. 12.

Figure 12:
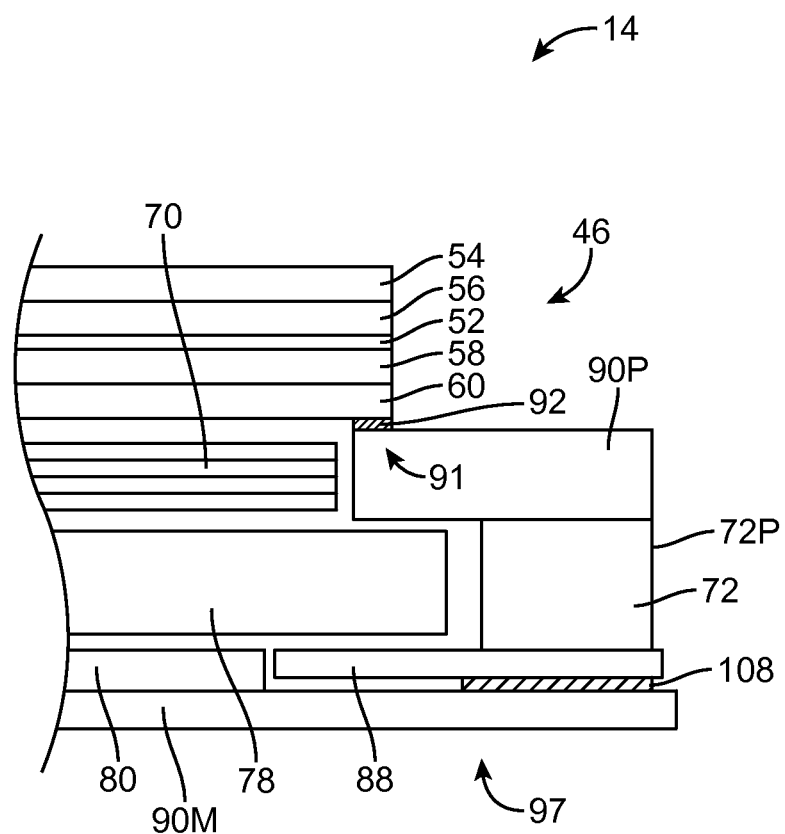
FIG. 12 is a cross-sectional side view of an illustrative display in which a plastic display chassis has been insert molded over a light-emitting diode package in accordance with an embodiment of the present invention.

As shown in FIG. 12, metal chassis 90M includes planar portion 97 which overlaps light guide plate 78. In the example of FIG. 12, metal chassis 90M does not include a c-shaped portion that wraps around light-emitting diodes 72.

Substrate 88 and light-emitting diodes 72 (sometimes collectively referred to as a "light bar") may be mounted on planar surface 97 of metal chassis 90M. If desired, an adhesive such as adhesive 108 may be used in attaching substrate 88 to sheet metal 90M. Adhesive 108 may be pressure-sensitive adhesive or other suitable adhesive. If desired, other mounting mechanisms may be used to mount substrate 88 to sheet metal 90M. Using an adhesive such as adhesive 108 is merely illustrative.

Light-emitting diodes 72 may each contain a semiconductor device that emits light. The semiconductor device in each diode may be mounted on lead frame structures in a molded plastic package such as molded plastic package 72P. In order to provide planar surface 91 on which display layers 46 are mounted, plastic chassis 90P may be insert molded (e.g., injection molded) over light-emitting diode packaging 72P. This type of configuration may help minimize mechanical stress on display 14.

Figure 13:
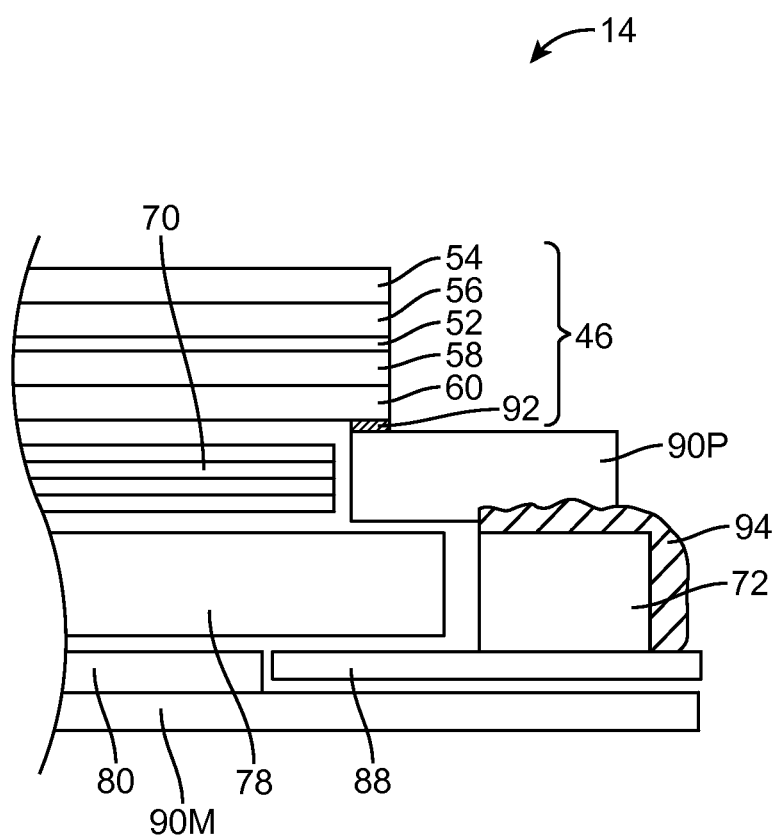
FIG. 13 is a cross-sectional side view of an illustrative display in which a plastic display chassis has been insert molded over a light-emitting diode package and in which an encapsulant has been formed over the light-emitting diode package in accordance with an embodiment of the present invention.

Another suitable embodiment in which metal chassis 90M does not include a bent portion that wraps around light-emitting diodes 72 is shown in FIG. 13. The arrangement shown in FIG. 13 is similar to the arrangement of FIG. 12 in that plastic chassis 90P is molded over light-emitting diodes 72.

In the example of FIG. 13, an encapsulant such as encapsulant material 94 may be formed over light-emitting diodes 72 (e.g., encapsulant 94 may be interposed between light-emitting diodes 72 and plastic chassis 90P). Encapsulant material 94 may be formed from potting material or may be formed from other suitable low pressure molding materials. Examples of materials that may be used for encapsulant 94 include epoxy, silicone, polyurethane, polyamide, other suitable materials, a combination of these materials, etc. Potting or encapsulating light-emitting diodes 72 may provide protection for light-emitting diodes 72 during molding of plastic chassis 90P over light-emitting diodes 72. Encapsulant 94 may also provide protection for light-emitting diodes 72 after device 10 has been fully assembled. For example, encapsulant 94 may protect light-emitting diodes 72 from dust, dirt, moisture, and vibration.

Figure 14:
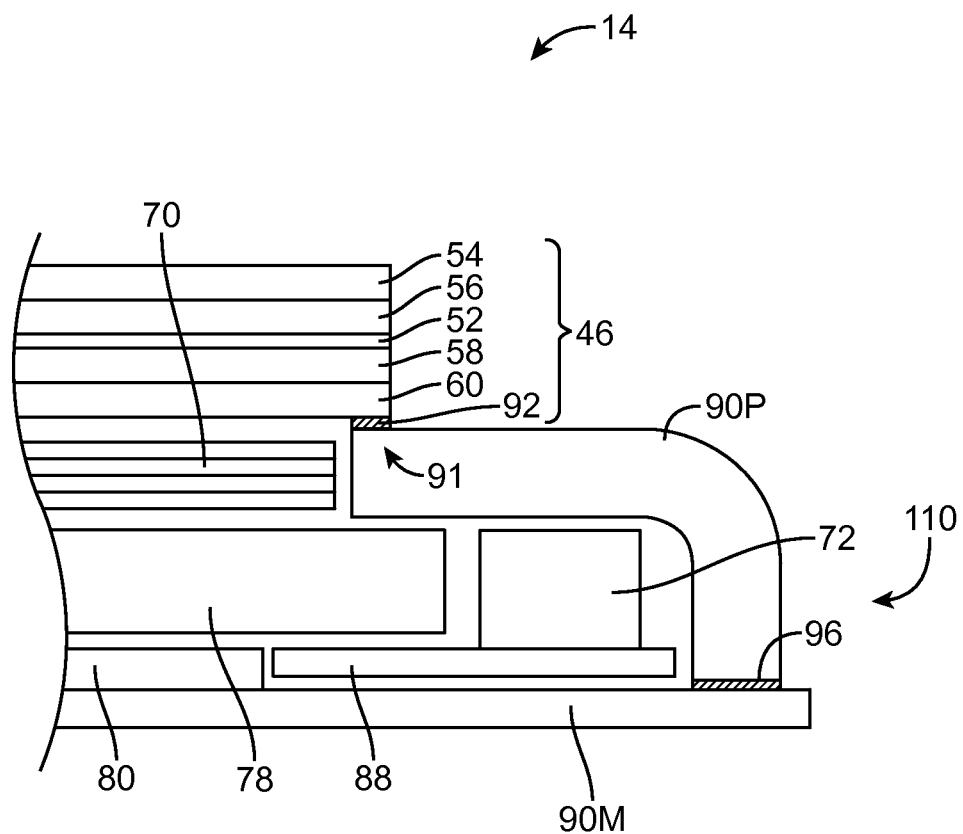
FIG. 14 is a cross-sectional side view of an illustrative display in which a plastic display chassis wraps around a light source and attaches to a metal display chassis in accordance with an embodiment of the present invention.

Another suitable embodiment in which metal chassis 90M does not include a bent portion that wraps around light-emitting diodes 72 is shown in FIG. 14. As shown in FIG. 14, plastic chassis 90P may have a planar portion such as planar portion 91 on which display layers 46 are mounted. Plastic chassis 90P may also have a bent portion such as bent portion 110 that wraps around light-emitting diodes 72 and attaches to metal chassis 90M.

Plastic chassis 90P may, for example, be injection molded over metal chassis 90, thereby forming a tightly sealed mechanical bond at interface 96. This is, however, merely illustrative. If desired, plastic chassis 90P may be molded and then subsequently attached at interface 96 using an adhesive (e.g., a pressure-sensitive adhesive or other suitable adhesive). The arrangement of FIG. 14 may provide structural support for display 14 while minimizing mechanical stress on display 14.

Figure 15:
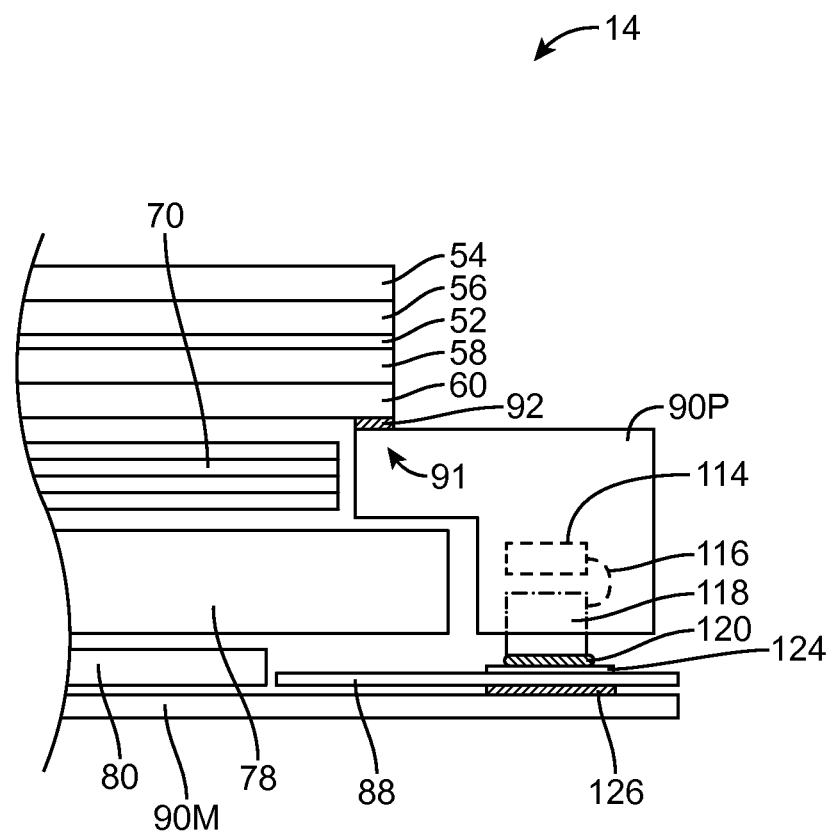
FIG. 15 is a cross-sectional side view of an illustrative display in which a plastic display chassis forms at least part of a package for a light-emitting diode in accordance with an embodiment of the present invention.

Another suitable embodiment in which metal chassis 90M does not include a bent portion that wraps around light-emitting diodes 72 is shown in FIG. 15. In the example of FIG. 15, plastic chassis 90P forms at least part of a package for light-emitting diodes 72. Each light-emitting diode may include a semiconductor device such as diode die 114. Diode die 114 may be mounted on a lead frame structure such as lead frame structure 118. A wire bond such as wire bond 116 may be used to electrically couple one of the diode's terminals to lead frame structure 118. Lead frame structure 118 may extend out from packaging 90P towards substrate 88 on which light-emitting diode 72 is mounted. Lead frame structure 118 may be mounted to solder pad 124 on substrate 88 using solder 120. If desired, substrate 88 may be mounted to metal chassis 90M using an adhesive such as adhesive 126.

Thermoplastic may be molded over diode die 114 and lead frame structures 118 to form a packaging for light-emitting diodes 72 while also forming planar surface 91 on which display layers 46 are mounted. With this type of arrangement, the housing that packages light-emitting diodes 72 may be integral with plastic support structure 90P that provides support surface 91 for display layers 46. This type of arrangement may help minimize mechanical stress on display 14.

Figure 16:
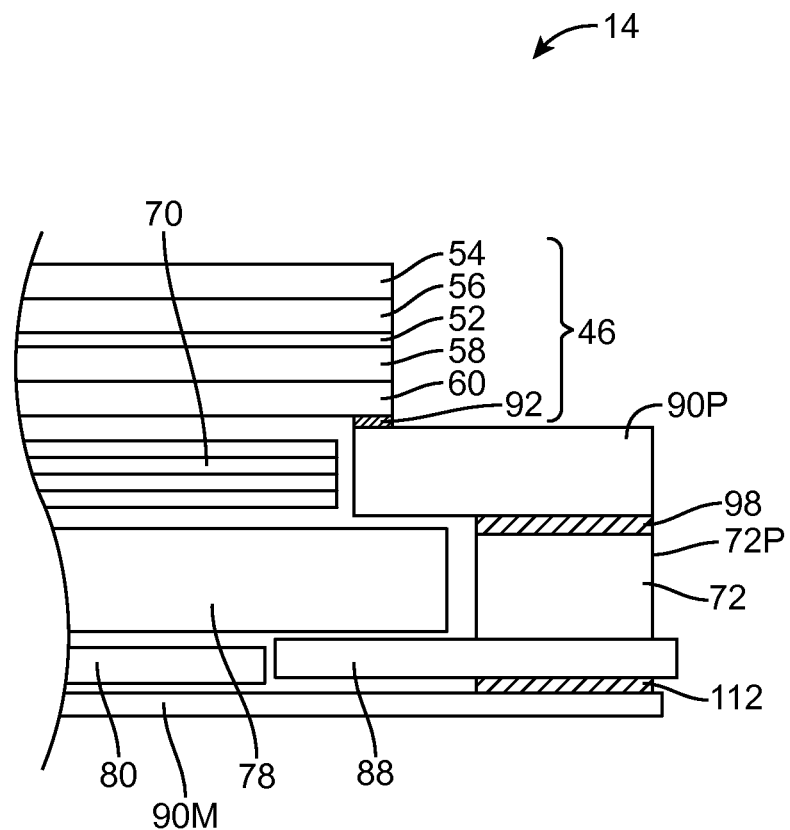
FIG. 16 is a cross-sectional side view of an illustrative display in which a plastic display chassis is adhered to a light-emitting diode package using adhesive in accordance with an embodiment of the present invention.

Another suitable embodiment in which metal chassis 90M does not include a bent portion that wraps around light-emitting diodes 72 is shown in FIG. 16. In the example of FIG. 16, plastic chassis 90P is attached to light-emitting diode package 72P using an adhesive such as adhesive 98. Substrate 88 on which light-emitting diodes 72 are mounted may be attached to metal chassis 90M using adhesive such as adhesive 112. Adhesives 98 and 112 may be liquid adhesives, light-cured adhesives, pressure-sensitive adhesives or other suitable adhesives.

The foregoing is merely illustrative of the principles of this invention and various modifications can be made by those skilled in the art without departing from the scope and spirit of the invention.

What is claimed is:

1. An electronic device, comprising:
   a display;
   a light source configured to provide light;
   a light guide plate configured to receive the light and to provide the light to the display as backlight illumination;
   a metal display chassis that has a curved portion that flexes about a flex axis and that at least partly surrounds the light source, wherein the metal display chassis includes at least one flex promotion feature in the curved portion that helps the curved portion of the metal display chassis to flex about the flex axis, wherein the curved portion has a first surface and a second surface interposed between the first surface and the light source and wherein the flex promotion feature comprises a plurality of openings that extend through the first and second surfaces; and
   an opaque film on the first surface that covers the plurality of openings, wherein the first surface is interposed between the opaque film and the second surface.

2. The electronic device defined in claim 1 wherein the at least one flex promotion feature comprises at least one opening in the metal display chassis.

3. The electronic device defined in claim 2 wherein the curved portion that flexes about the flex axis comprises a bend and wherein the at least one opening is formed in the bend.

4. The electronic device defined in claim 2, further comprising a layer of opaque film formed over the at least one opening that prevents light from passing through the at least one opening.

5. The electronic device defined in claim 1 wherein the at least one flex promotion feature comprises a plurality of perforations formed in the metal display chassis.

6. The electronic device defined in claim 1 wherein the display comprises at least one display layer, wherein the plastic display chassis is molded over the curved portion of the metal display chassis that flexes about a flex axis, and wherein a portion of the at least one display layer is mounted to the plastic display chassis.

7. An electronic device, comprising:
   a display;
   a light source configured to provide light;
   a light guide plate configured to receive the light and to provide the light to the display as backlight illumination;
   a metal display chassis having a bent portion that at least partly surrounds the light source, wherein the bent portion of the metal display chassis comprises a plurality of slits; and
   an opaque film formed over the plurality of slits that reduces a transmission of light through the plurality of slits, wherein the bent portion of the metal display chassis is interposed between the light source and the opaque film.

8. The electronic device defined in claim 7 wherein the bent portion bends around a bend axis and wherein the slits partially surround the bend axis.

9. The electronic device defined in claim 7 wherein the opaque film comprises black polyester film.

10. The electronic device defined in claim 7 wherein the opaque film comprises a plurality of discrete portions each covering a respective one of the slits in the metal display chassis.

11. The electronic device defined in claim 7 wherein the opaque film comprises a continuous layer of opaque film that covers all of the slits in the metal display chassis.

12. The electronic device defined in claim 7 further comprising:
   a plastic display chassis molded over the bent portion of the metal display chassis.

13. The electronic device defined in claim 12 wherein the display comprises a display layer that is mounted to the plastic display chassis.

14. The electronic device defined in claim 13 wherein the display layer comprises a thin-film transistor layer.

15. The electronic device defined in claim 12 wherein the plastic display chassis has a protruding portion that is attached to the light guide plate with adhesive.

16. The electronic device defined in claim 7 wherein the bent portion of the metal display chassis curves around the light source.

17. The electronic device defined in claim 1 wherein the curved portion of the metal display chassis curves around the light source.

* * * * *